Dec. 7, 1965   W. H. KEENAN   3,222,087
BOARD WITH MAGNET MEANS FOR HOLDING ACCOUNTING FORMS
Filed Nov. 12, 1963
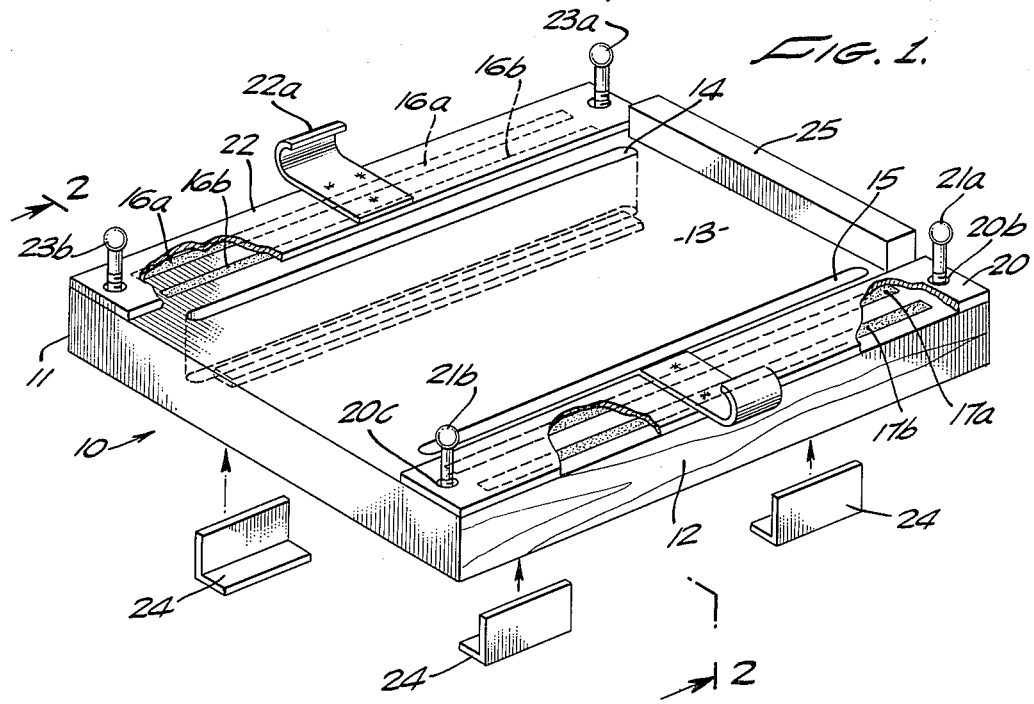
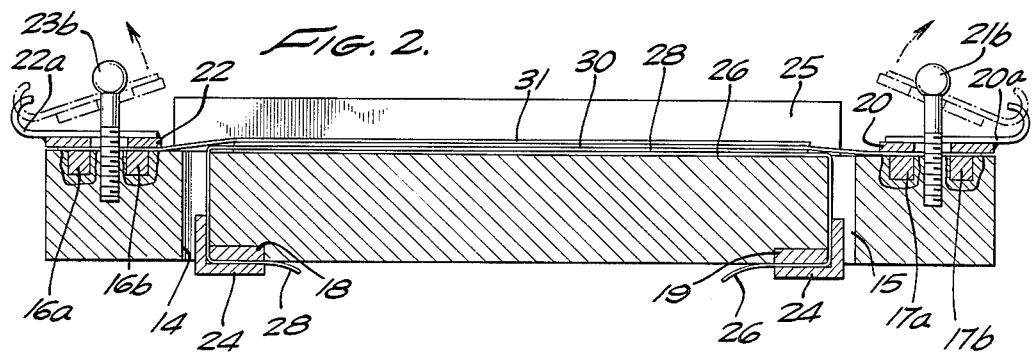
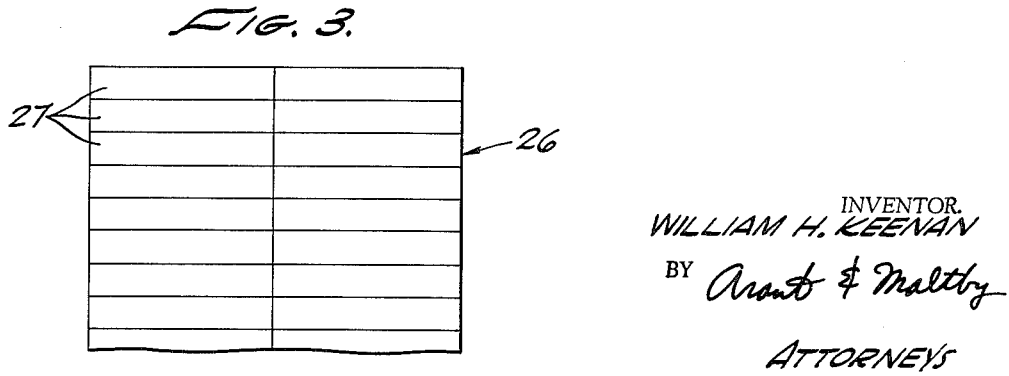
INVENTOR.
WILLIAM H. KEENAN
BY Arant & Maltby
ATTORNEYS United States Patent Office 3,222,087
Patented Dec. 7, 1965

3,222,087
BOARD WITH MAGNET MEANS FOR HOLDING ACCOUNTING FORMS
William H. Keenan, 7546 Cowan Ave., Los Angeles, Calif.
Filed Nov. 12, 1963, Ser. No. 323,023
9 Claims. (Cl. 282—29)

This invention relates to record keeping and accounting and more especially to a board having a magnetic means for holding accounting forms.

In record keeping and accounting it is often desirable to make a permanent or semi-permanent record of a number of individual transactions or entries, and at the same time to make entries of the several items on individual record sheets peculiar to a number of different accounts or other type of break-down of the individual transactions. Duplicate record making using carbon copies is, of course, well known, and the most common method of making the stated type of duplicate records is the use of multiple forms wherein one or more of the forms are originally attached to the others and separated therefrom by weakened lines or tear-out strips. This type of form arrangement and assembly is unsatisfactory for the type of record keeping and accounting mentioned above, wherein it is desirable that the separate sheets be independent of the tear-out or tablet type.

The well known peg-board systems are quite satisfactory from an operational standpoint, however, the necessity of cutting holes in the paper in precise locations to fit over the pegs causes the cost of the paper to be nearly double what it would otherwise be.

The primary purpose of the present invention, therefore, is to provide an accounting board for making entries on three or more record sheets simultaneously, and which does not require precisely positioned holes to be formed in the record sheets prior to their attachment to the board.

Another object of the invention is to provide an accounting board adapted for the quick attachment or detachment of movable record sheets upon which accounting entries are to be made, and which does not tire the hands of the operator by usage of spring clamps or the like.

A further object of the invention is to provide an accounting board having magnetic means for holding a plurality of record sheets in registry in a superimposed arrangement.

Yet another object of the invention is to provide an accounting board having holding means on respective side edges thereof for holding the side edges of two record sheets, and an elongated slot formed in the board between one of such holding means and the writing surface of the board, for grasping the side edge of a third record sheet.

According to the invention the carbon paper or other copying techniques are entirely conventional, the record keeping and accounting procedures are entirely conventional, and the board is in general used for a well established and conventional purpose. However, the specific holding means for holding the side edges of respective sheets of paper, or other suitable record sheets, are novel. Furthermore, the arrangement of these holding means relative to the board itself is novel. The useful result achieved by the invention is that the need for cutting holes in the edges of the record sheets for alignment purposes is eliminated.

More specifically, the invention in its broadest concept comprises a pair of holding means associated with respective sides of the upper surface of the board, at least one of these holding means being magnetic in its operation. The magnetic holding device is not readily capable of grasping two record sheets simultaneously, in properly aligned relationship; therefore, an elongated slot is formed through the board, which is situated between the magnetic holding means and the writing surface of the board. An additional holding means, preferably also magnetic in nature, is associated with the slot for retaining the edge of a third record sheet.

The objects and advantages of the invention will be more fully understood from the following description considered in conjunction with the accompanying drawing, wherein:

FIGURE 1 is a perspective view of an accounting board in accordance with the present invention;

FIGURE 2 is a sectional view taken along the line 2—2 of FIGURE 1;

FIGURE 3 is a face view of a typical accounting record sheet used in conjunction with the invention.

Referring now to the drawing, the accounting board indicated generally at 10 is of rectangular shape having side edges 11 and 12 and a top surface 13 whose central portion provides a flat writing surface in conventional fashion. A slot 14 extending most of the length of the board is formed in the board parallel to and spaced inwardly from side 11; and a slot 15 is similarly formed adjacent to side 12. Two such slots are included in the presently illustrated embodiment of the invention, in order that the device may accommodate four record sheets simultaneously. It will of course be understood that only a single slot is needed if the device is to be used for only three record sheets at a time.

A first holding device adjacent side edge 12 of the board includes a pair of rows of magnets 17a and 17b which are embedded in respective grooves formed in the surface of the board, said grooves and rows of magnets extending lengthwise of the board and being laterally separated in parallel relationship. A flat metal strip 20 of ferrous metal provides a magnetizable member capable of being attracted by, and retained in relatively firm engagement with, the rows of magnets 17a and 17b. Strip 20 is of sufficient width to engage both rows of magnets simultaneously, and is of sufficient length so that both its ends project beyond the ends of the rows of magnets. Openings 20b and 20c are formed in these projecting ends of the strip 20. Screws 21a and 21b are secured to the upper surface of the board, extend through respective ones of the openings 20b and 20c, and thereby maintain the strip 20 in captive relationship to the board while at the same time permitting it to be lifted vertically for disengagement from the magnets. A handle 20a is fastened to the upper and outer edge of magnetizable strip 20 for manipulating same.

It will therefore be seen that strip 20 is conveniently manipulated by its handle 20a either to admit the side edge of a sheet of paper which is to be grasped between the strip 20 and the magnetic rows 17a and 17b, or to release the edge of a sheet of paper which has already been used in the accounting device and needs to be removed therefrom.

A second holding device is provided on the upper surface of the board between edge 11 and slot 14. The second holding device is in all respects identical to the first, and includes embedded rows of magnets 16a and 16b, flat magnetizable strip 22 having a handle 22a and end openings 22b and 22c, and retaining screws 23a and 23b.

The third holding device will now be described. A row of magnets 18 is embedded in the under surface of the board on the inner side of slot 14. A magnetizable member 24 has an L-shaped cross section with one side of the L being adapted to engage the magnetic strip 18. It will be readily understood that when a sheet of paper such as 28 has its side edge portion extended downward through slot 14 and underneath the board in engagement with magnet row 18, the L-shaped retaining member 24 produces a sharply creased corner in the paper and grasps the paper tightly against the board and the magnet row 18, thereby providing a secure and definite reference position for the edge of the sheet of paper.

A fourth holding device illustrated in conjunction with the slot 15 is identical to the third device, and includes a magnet row 19 and L-shaped retaining member 24.

In the operation of the invention, a record sheet such as 26 is provided with a plurality of line spaces 27 on which separate entries are to be made. The side edges of sheet 26 is inserted downwardly through slot 15 and grasped between retaining member 24 and magnet row 19, so that the main body of sheet 26 rests upon the writing surface of the board. A second sheet 28 is laid on top with its left side edge (as seen in FIGURE 2) extending downward through slot 14 and retained in place by retaining member 24 and magnet strip 18. A third sheet 30 is laid on top of 28, with its right edge being grasped between the magnetizable strip member 20 and magnet rows 17a, 17b of the first holding device. A fourth and top sheet 31 has its left edge grasped between strip member 22 and the magnet row 16a, 16b of the second holding device.

It will be understood that the upper sheets 30 and 31 are made smaller than the lower sheets 26 and 28; and conversely, that these lower sheets are provided with a wider edge portion for the purpose of retaining same in the device. As previously mentioned, the use of carbon or other equivalent means for writing multiple copies is in accordance with conventional practice and forms no part of the present invention.

While specific forms of the magnetic holding means have been illustrated herein it will be understood that other forms thereof may be used if desired. For example, the relative positions of the magnets and magnetizable members may be reversed; or a pair of permanent magnets may be utilized to form each holding device.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A board with magnet means for holding accounting forms, comprising:
   a substantially rectangular board having a flat writing surface;
   a pair of holding means extending in parallel relationship along respective side portions of said board, and adapted to hold the side edges of respective sheets of paper whose main portions are disposed in superimposed relationship upon said writing surface of said board;
   at least one of said holding means including a magnet and a magnetizable member, one of which is embedded in the surface of said board while the other is movable relative thereto;
   said board having an elongated slot formed therein between said writing surface and said one holding means, whereby a third sheet of paper may rest on said writing surface beneath said first-mentioned sheets with its side edge extending into said slot;
   and magnetic holding means cooperating with said slot for retaining said side edge of said third sheet of paper.

2. A device as claimed in claim 1 wherein said magnetic holding means includes an elongated magnet attached to said board along the inner and under edge of said slot, and an elongated magnetizable member movable relative thereto.

3. The device claimed in claim 2 wherein said last mentioned magnetizable member is of L-shaped cross section.

4. A device as claimed in claim 1 wherein said board has a second elongated slot formed therein between said writing surface and the other of said holding means, and which further includes additional magnetic holding means cooperating with said second slot for retaining the side edge of a fourth sheet of paper.

5. A device as claimed in claim 1 wherein said magnet of said one holding means is embedded in the surface of said board, said magnetizable member thereof is an elongated flat strip of ferrous metal having two openings therein, and which further includes a pair of screws extending through respective ones of said openings into the surface of said board.

6. A device as claimed in claim 5 which further includes a handle attached to the upper and outer edge of said flat strip member for selectively lifting the same, in a substantially vertical path, out of the magnetic influence of said magnet to thereby release the associated sheet of paper.

7. An accounting device comprising, in combination:
   a substantially rectangular board having a flat writing surface, and having an elongated slot formed therein along one side of said writing surface;
   first holding means extending along the opposite edge of said writing surface;
   second holding means extending along the upper surface of said board on the side of said slot away from said writing surface, said second holding means including a row of magnets is embedded in the surface of said board, an elongated flat strip of ferrous metal having openings formed adjacent its respective ends, a pair of screws fastened into the surface of said board adjacent respective ends of said row of magnets and received in corresponding openings of said flat strip for retaining the same in movable relationship relative to said board;
   and third holding means attached to the under surface of said board on the inner side of said slot;
   each said holding means being adapted to releasably retain the edge portion of a respective one of three sheets of paper whose main portions are disposed in superimposed relationship upon said writing surface of said board.

8. A device as claimed in claim 7 wherein said second holding means includes a second row of magnets embedded in the surface of said board, spaced laterally from and extending parallel to said first-named row of magnets; said flat metal strip being of sufficient width to engage both of said rows of magnets simultaneously.

9. A device as claimed in claim 8 wherein said second holding means additionally includes a handle attached to the upper and outer edge of said flat metal strip for manipulating the same.

References Cited by the Examiner

UNITED STATES PATENTS

| 2,397,332 | 2/1950 | Teetor | 281—44 |
| 2,567,279 | 9/1951 | Foster et al. | 281—44 |
| 2,868,561 | 1/1959 | Bianchi et al. | 282—29.2 |

EUGENE R. CAPOZIO, *Primary Examiner.*

LAWRENCE CHARLES, JEROME SCHNALL,
*Examiners.*